US 6,650,092 B1
United States Patent
Lidak et al.

(10) Patent No.: US 6,650,092 B1
(45) Date of Patent: Nov. 18, 2003

(54) SYSTEM AND METHOD FOR REGULATING A POWER SYSTEM WITH FEEDBACK USING CURRENT SENSING

(75) Inventors: Petr Lidak, Hladke Zivotice (CZ); Nigel Allison, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/155,316
(22) Filed: May 24, 2002
(51) Int. Cl.[7] .................................................. G05F 1/70
(52) U.S. Cl. ........................................ 323/207; 323/222
(58) Field of Search ............................. 361/818; 323/207, 323/222; 363/80, 81, 89

(56) References Cited

U.S. PATENT DOCUMENTS

| 5,612,609 A | * | 3/1997 | Choi | 323/210 |
| 5,619,405 A | * | 4/1997 | Kammiller et al. | 363/80 |
| 5,644,214 A | * | 7/1997 | Lee | 323/211 |
| 6,259,613 B1 | * | 7/2001 | Lee et al. | 363/89 |
| 6,275,397 B1 | * | 8/2001 | McClain | 363/89 |
| 6,411,533 B2 | * | 6/2002 | Hooijer et al. | 363/89 |
| 6,469,917 B1 | * | 10/2002 | Ben-Yaakov | 363/44 |

* cited by examiner

Primary Examiner—Shawn Riley
(74) Attorney, Agent, or Firm—Robert L. King; Joanna G. Chiu

(57) ABSTRACT

A system (10) regulates current and voltage in a power system by using a correction signal that is modified to compensate for errors associated with manufacturing variations. The correction signal controls a power switch (49) that selectively sources/shunts current to/from the output load (26) and power source. The compensation technique applies to systems conducting either an A.C. or a D.C. voltage. A current controller (44) is placed in a control loop. The current controller contains circuitry having an offset voltage and loop gain errors as a result of manufacturing variations. At least one of the offset voltage and loop gain are dynamically calculated by a loop controller (38) and the result is used to modify the correction signal to provide an accurate output load voltage and power line current.

27 Claims, 6 Drawing Sheets

SYSTEM AND METHOD FOR REGULATING A POWER SYSTEM WITH FEEDBACK USING CURRENT SENSING

FIELD OF THE INVENTION

This invention relates generally to power supply systems, and more specifically, to electronic controlled regulation of the power supply systems.

BACKGROUND OF THE INVENTION

Power systems are commonly used to convert alternating current (AC) voltage provided by a power company to a desired voltage for various loads, such as AC and direct current (DC) motors. Many countries use AC voltages having differing magnitudes and frequency. A full wave bridge rectifier is often used to convert an alternating current voltage to a direct current voltage. A disadvantage with known bridge rectifiers is that they produce a current waveform that contains multiple short current pulses or spikes synchronized to the power supplier's voltage signal. As the proliferation of small appliances and other electronics has occurred, power suppliers have experienced a detrimental effect on their distribution systems caused by the widespread current pulses being injected onto the distribution system. The problem is severe enough that government regulations are becoming common to establish regulations that would minimize the problem. The spikes generate harmonic signals into the distribution system often known as electromagnetic interference (EMI).

Another common problem for power suppliers is known as the power factor issue. Optimally, a load in a power system would be purely resistive. A purely resistive load will result in maximum power efficiency and thus a power factor of one. The power factor is defined as the cosine of the phase angle between the voltage applied to a load and the current passing through it. For example, a purely resistive load has a power factor of one where the voltage and current are always in phase. A power factor of one is optimal for power delivery and this condition is shown in FIG. 1. However in reality, loads typically possess a significant amount of impedance (both inductive and capacitive components) that significantly lowers the power factor causing the voltage and current to be out of phase. An example is shown in FIG. 2.

Prior solutions to address the EMI problem have included correction circuitry known as power factor correctors. Power factor correctors improve power distribution efficiency and reduce AC line EMI. Power correction circuitry is often used in industrial control and is increasingly required in home appliance dues to increasing governmental regulations. Such power correction circuits are typically isolated and independent integrated circuits that are separated from conventional voltage regulation control circuitry. Such integrated circuits typically have no compensation for the commonly known problem of component value variation caused by temperature variation. Also, such circuits often require precision external components that add significant cost in order to increase efficiency. Additionally, advanced digital signal processors (DSPs) having high data throughput are often used to control advanced voltage regulators. Less expensive power correction circuits typically must be factory adjusted to compensate for manufacturing variations of the components. Another approach in improving power correction circuit performance is to use a less expensive processor such as an eight-bit microcontroller in conjunction with very high precision components, such as a precision comparator. If a lower precision comparator is used in such an application, offset and gain errors commonly associated with analog comparators contribute significantly to reduce the efficiency of the system.

BRIEF DESCRIPTION OF THE DRAWINGS

The present invention is illustrated by way of example and is not limited by the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 3:
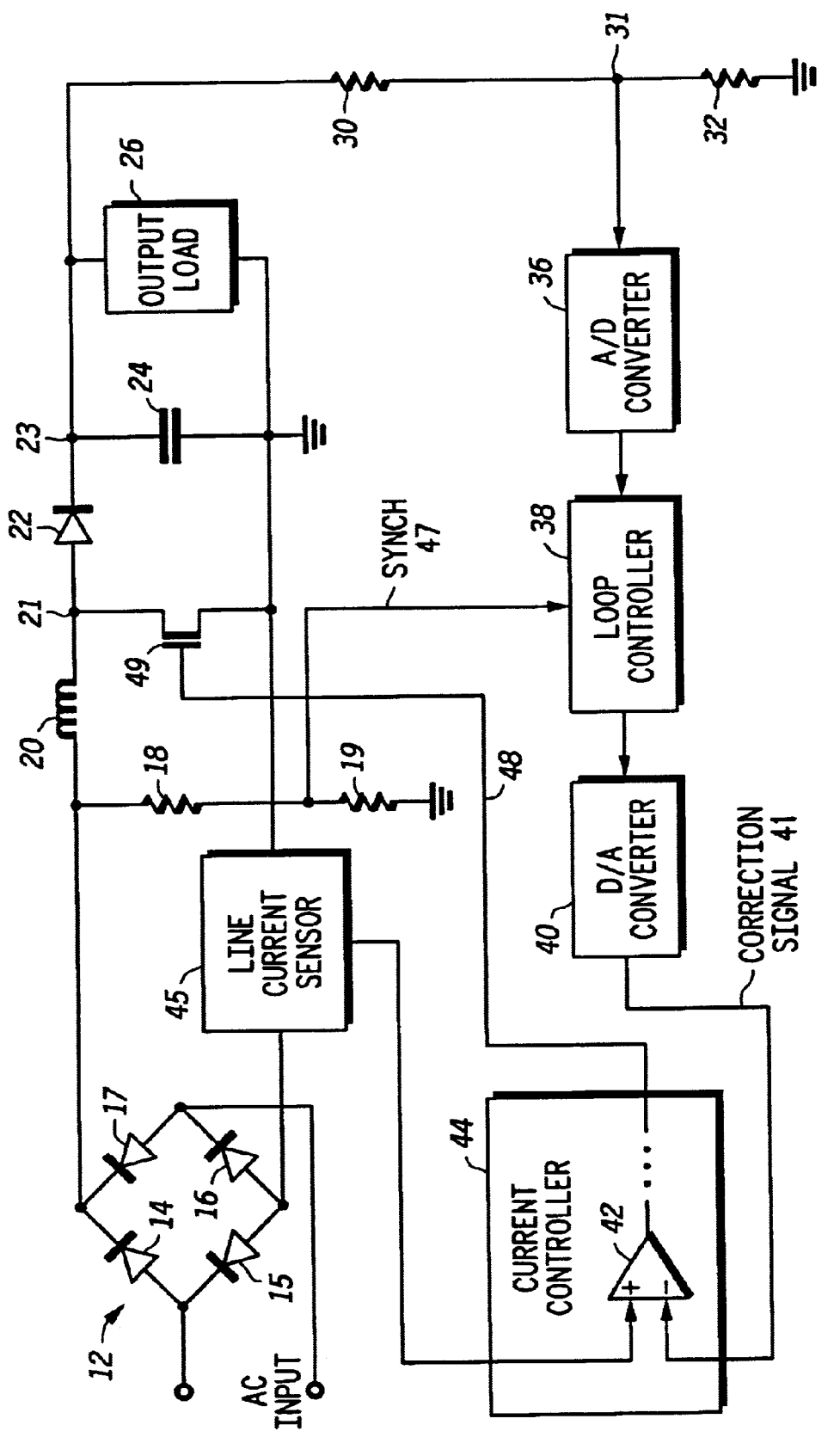
FIG. 3 illustrates in partial schematic form a power system in accordance with the present invention.

Illustrated in FIG. 3 is an exemplary power system for use with the present invention. A power system 10 has a full wave bridge rectifier 12 formed of diodes 14, 15, 16 and 17. An anode of diode 14 is connected to a cathode of diode 15 at a first terminal of an A.C. Input for receiving an A.C. input line voltage. A cathode of diode 14 is connected to a cathode of diode 17. An anode of diode 17 is connected to a cathode of diode 16 at a second terminal of the A.C. Input. An anode of diode 16 is connected to an anode of diode 15. A resistor 18 has a first terminal connected to the cathode of diode 14 and a second terminal connected to a first terminal of a resistor 19. A second terminal of resistor 19 is connected to a ground terminal. A first terminal of an inductor 20 is connected to the first terminal of resistor 18. A second terminal of inductor 20 is connected to an anode of a diode 22 at a node 21. A cathode of diode 22 is connected to a first electrode of a capacitor 24 at a node 23. A second electrode of capacitor 24 is connected to the ground terminal. A first terminal of an output load 26 is connected to node 23, and a second terminal of output load 26 is connected to the ground terminal. A first terminal of a resistor 30 is connected to node 23, and a second terminal of resistor 30 is connected to a first terminal of a resistor 32 at a node 31 and to an input of an analog-to-digital (A/D) converter 36. A second terminal of resistor 32 is connected to the ground terminal. An output of A/D converter 36 is connected to an input of a loop controller 38. An output of loop controller 38 is connected to an input of a D/A converter 40. An output of D/A converter 40 provides a correction signal 41 and is connected to an inverting or negative input of a comparator 42 of a current controller 44. A line current sensor 45 has a first terminal connected to the ground terminal and a second terminal connected to the anode of diode 15. An output of line current sensor 45 is connected to a positive or non-inverting input of comparator 42. An output of current controller 44 is connected to a gate or control electrode of a power switch 49. A first current electrode or drain of power switch 49 is connected to node 21. A second current electrode or source of power switch 49 is connected to the ground terminal. Although power switch 49 is illustrated as an N-channel power MOSFET device, it should be appreciated that other types of switches may be used. The second terminal of resistor 18 is connected to a control input of the loop controller 38 for providing a synchronizing (SYNCH) signal 47.

In operation, power system 10 receives an A.C. voltage at two inputs of full wave bridge rectifier 12. The two inputs will be referred to herein as the power line. Bridge rectifier 12 converts the A.C. voltage to an approximating D.C. voltage in a conventional manner. A D.C. to D.C. conversion is provided by inductor 20, diode 22, capacitor 24 and power switch 49 in a conventional manner. As a result, no detailed explanation will be given regarding the specific waveforms that are generated as the varying voltage and current waveforms are generated across inductor 20, diode 22, capacitor 24 and power switch 49. It should be appreciated that other voltage converter structures and circuitry than that shown may be used in connection with the present invention. For example, a multi-phase voltage rectifier may be used in lieu of bridge rectifier 12 to provide an approximating D.C. voltage.

A varying output load current conducts through output load 26. It should be further appreciated that output load 26 may be either an A.C. or a D.C. load. Output load 26 may consist of further voltage conversion stages (not shown). Additionally, output load 26 may be a single-phase load or a multi-phase load.

The output load voltage across output load 26 at node 23 is scaled by a resistive network formed by resistors 30 and 32 to provide a proportional voltage input to the A/D converter 36. In the illustrated form, the output load voltage is a varying value D.C. voltage having noise and error content. In combination, A/D converter 36, loop controller 38 and D/A converter 40 function as a voltage controller to regulate the output load voltage and remove noise and error content. The output load voltage is an analog quantity and is converted to an equivalent multiple-bit digital value by A/D converter 36. Loop controller 38 and D/A converter 40 function in combination to provide a correction signal 41 to current controller 44. The current controller 44 provides a switch control signal 48 to control conduction of power switch 49. The current controller 44 controls the current flowing in the power line based upon current measurements taken by Line current sensor 45. Line current sensor 45 provides an analog signal to the positive input of comparator 42 that is proportional to the current flowing in the power line. In order to make sure that the loop controller 38 is synchronized and in phase with the AC input signal, a synchronizing signal (SYNCH) is connected to loop controller 38. Resistors 18 and 19 form a resistive network and divide the voltage across the line terminals to a smaller value for use by loop controller 38. Control signal 48 functions to selectively cause current to flow through inductor 20 into the ground terminal and hence through the power line. Control signal 48 also functions to selectively disrupt the current flowing through power switch 49, causing the voltage at node 21 to rise. Whenever the voltage at node 21 exceeds the voltage at node 23, diode 22 conducts supplying current into capacitor 24 and output load 26. The loop controller 38 together with the current controller 44 function to drive (i.e. switch) power switch 49 resulting in the power line current regulation and output load voltage regulation required for power factor correction. Variations in the output load current can be compensated by the current steering action implemented when power switch 49 is being switched, thereby affecting the size of the power line current. It should be noted that while the following explanation of power system 10 is made in the context of a sinusoidal input current, other trigonometric waveforms may be utilized in connection with power system 10. For example, step-wise sine wave approximations may be used.

Figure 4:
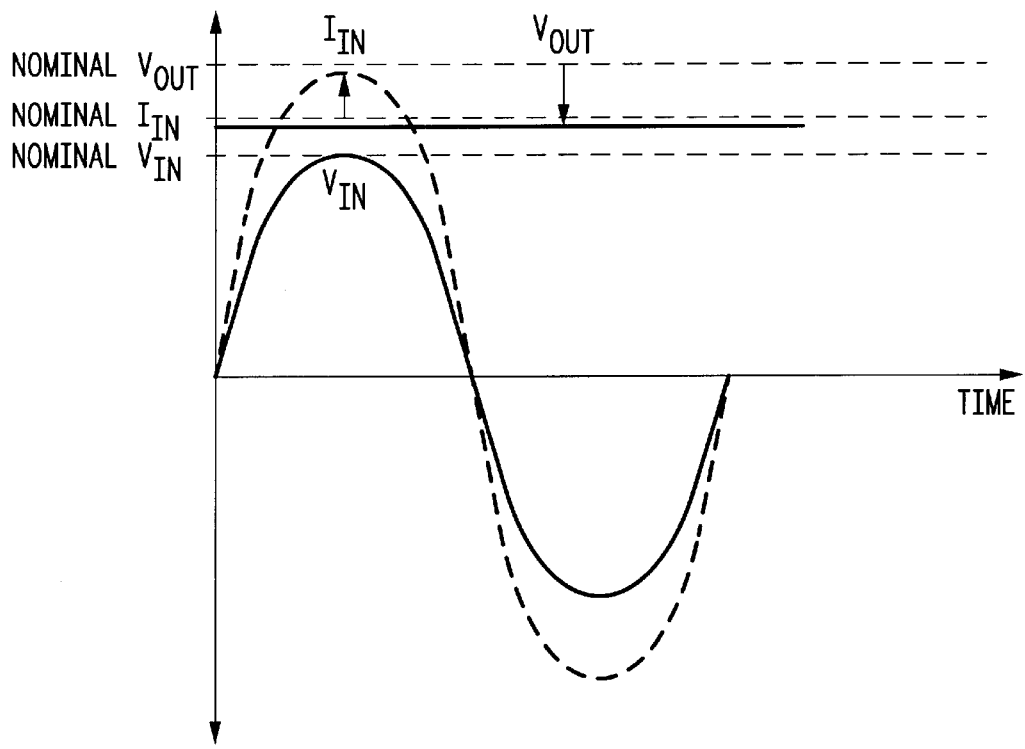
FIG. 4 illustrates in graphical form voltage and current relationships when output load current increases.

In power system 10, the output power will approximately equal the input power to the system. As a result, if the output load current increases then the output voltage, Vout, will decrease causing the input current, Iin, to increase in response. This relationship is illustrated in FIG. 4.

Figure 5:
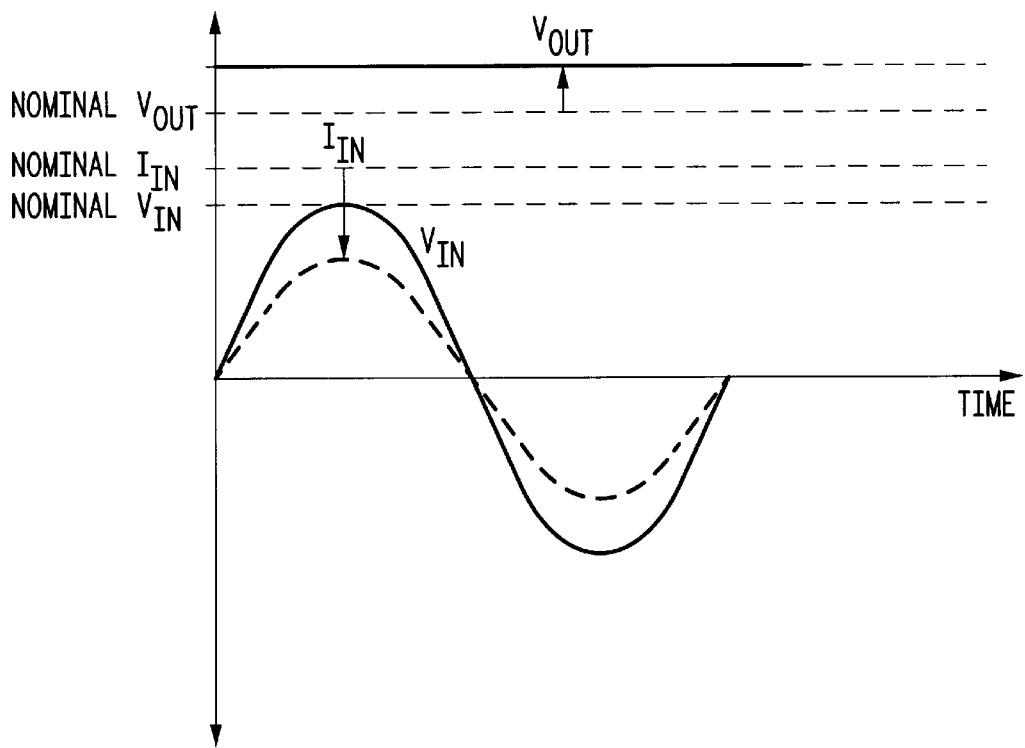
FIG. 5 illustrates in graphical form voltage and current relationships when output load current decreases.

Similarly, if the output load current decreases, then the output voltage, Vout, will increase causing the input current, Iin, to decrease in response. This relationship is illustrated in FIG. 5. Power system 10 then controls the input current Iin by using correction signal 41 in order to restore Vout to its nominal value.

Figure 6:
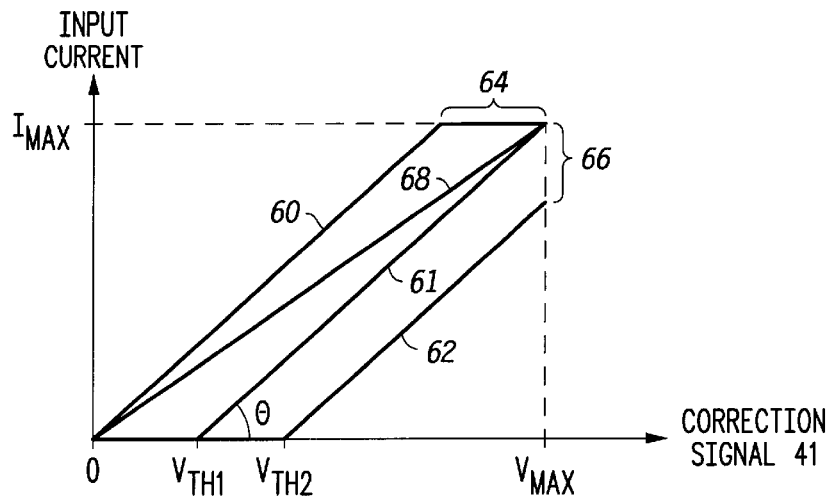
FIG. 6 illustrates in graphical form the relationship between input current and output voltage in the power system of FIG. 3.
Figure 7:
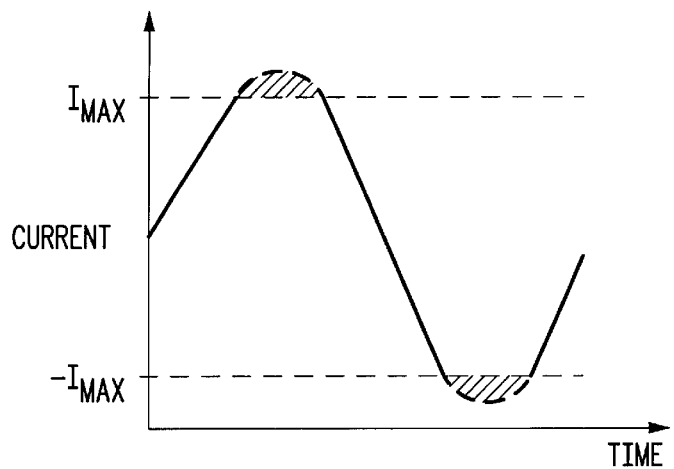
FIG. 7 illustrates in graphical form voltage and current relationships when the gain of the system of FIG. 3 limits the maximum input current.

Referring to FIG. 6, voltage/current curves illustrate the impact that manufacturing and other errors have on the power line current, referred to as the Input Current, and on the correction signal 41 voltage. In the illustrated form, three undesired curves, curves 60, 61 and 62 are possible. Every power system has a specified maximum input current and output load voltage. Curve 60 represents an operating condition when the closed loop gain exceeds the designed value resulting in the maximum input current being reached or exceeded before the maximum correction signal 41 has been reached resulting in an error designated as an error 64. This condition is represented graphically in FIG. 7 wherein distorted waveforms are illustrated for the input current. In particular, the correction signal 41 is unable to reach the $V_{max}$ value. As a result, the input current prematurely reaches the $I_{max}$ value and is either clipped or overshoots the $I_{max}$ value resulting in a flattened, distorted waveform that contains undesirable harmonics. As a result, the desired power will not be realized. When the $I_{max}$ value is exceeded, components have to be overspecified to account for this potential condition or otherwise damage to components in the system may result.

Curve 61 represents an operating condition in which a threshold voltage ($V_{TH}$) error associated with comparator 42 offsets the output voltage in a positive direction which creates no output current while some current is expected. All operational amplifiers have an offset voltage, $V_{offset}$, due to variation in the component values. As a result, the slope of curve 61, which is designated by an angle θ, differs from the slope of curve 68. The slope of each curve represents the closed loop gain of power system 10. Therefore, due to the offset voltage of comparator 42, an incorrect current gain, $I_{gain}$, will occur resulting in current errors present in the A.C. input. The offset voltage error varies during operation and between products may be either a positive voltage or a negative voltage. As a result of this wide variation in manufacturing predictability, static compensation techniques to correct this source of error do not effectively remove the errors in the A.C. input current.

Figure 1:
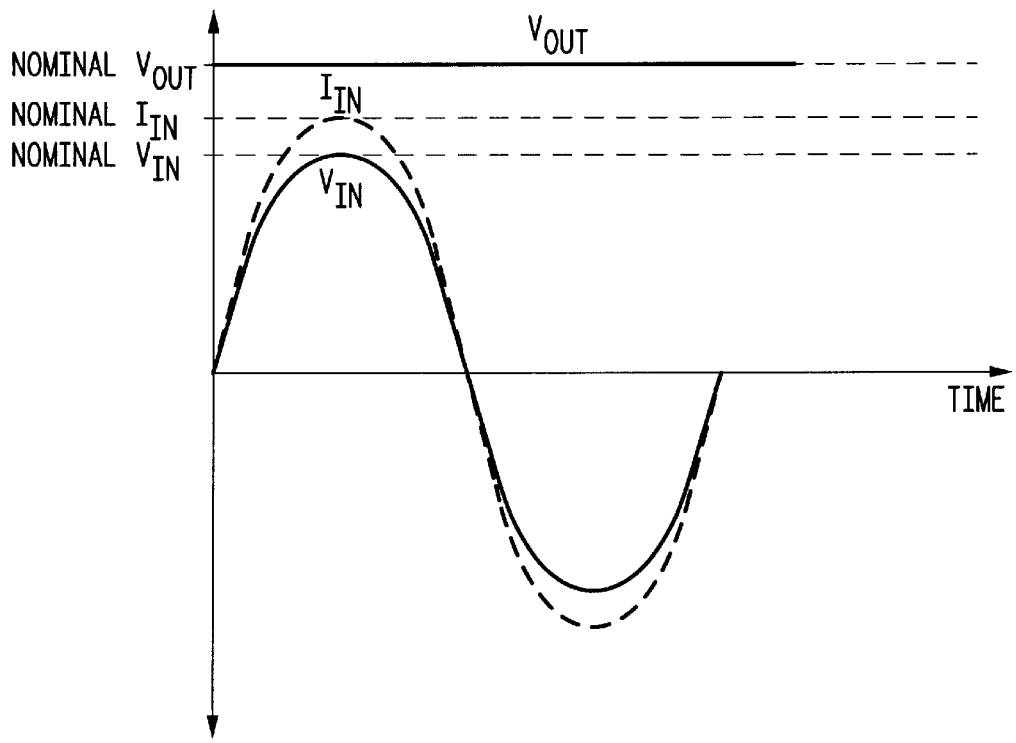
FIG. 1 illustrates in graphical form a power system having a power factor of one.
Figure 2:
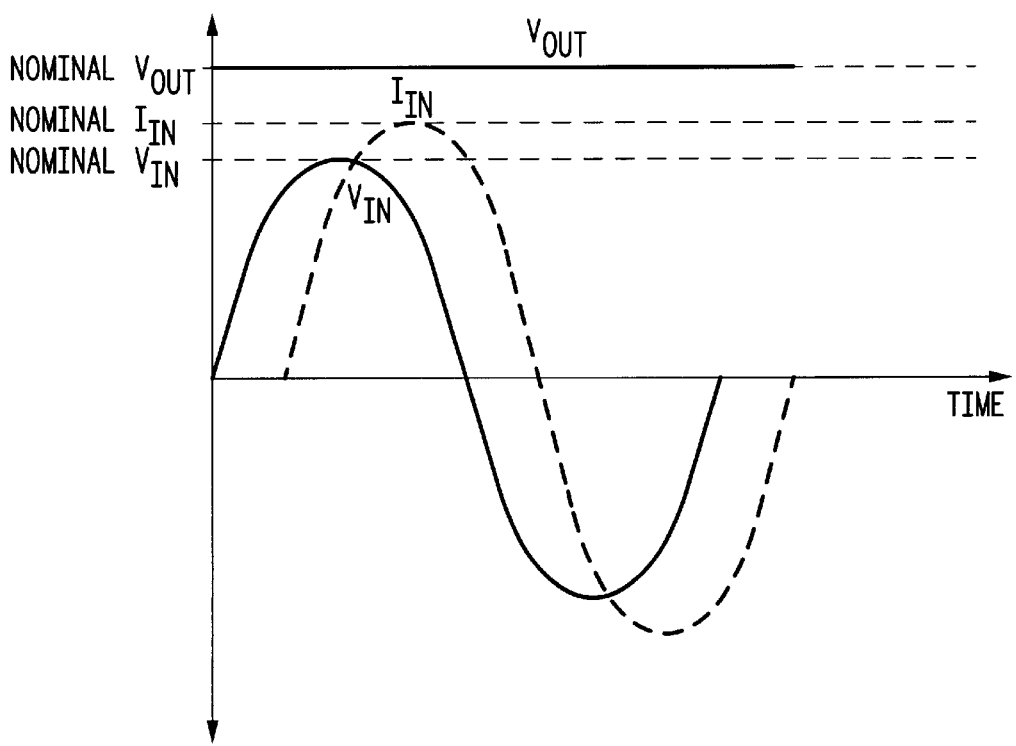
FIG. 2 illustrates in graphical form a power system having a power factor that is less than one.
Figure 8:
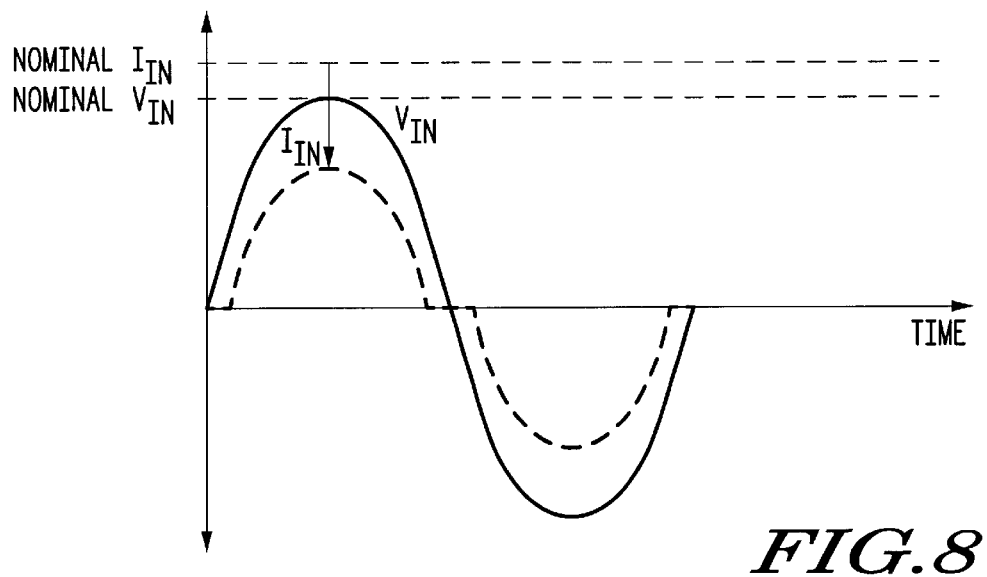
FIG. 8 illustrates in graphical form voltage and current relationships when an offset voltage exists in the power system of FIG. 3.

Curve 62 represents an operating condition in which when the closed loop gain again exceeds the designed value but results in the maximum correction signal 41 being reached or exceeded before the maximum input current has been reached resulting in an error designated as error 66. This condition is represented graphically in FIG. 8 wherein distorted waveforms are illustrated for the input current. In particular, the current curve is unable to reach the $I_{max}$ value and results in a waveform with crossover distortion and reduced amplitude that contains undesirable harmonics. The current differential between the $I_{max}$ value and the actually obtained maximum current is a function of error (i.e. deviation from the intended value) in the closed loop gain and the offset voltage of power system 10. The desired power will not be realized. In contrast, curve 68 of FIG. 2 represents the desired waveform wherein a predetermined slope represents the desired gain of the closed loop of power system 10. When there is no correction signal 41, it is desired that there be no A.C. line input current. Similarly, when a desired maximum correction signal 41 is reached, a desired maximum A.C. line input current, $I_{max}$, should result.

Figure 9:
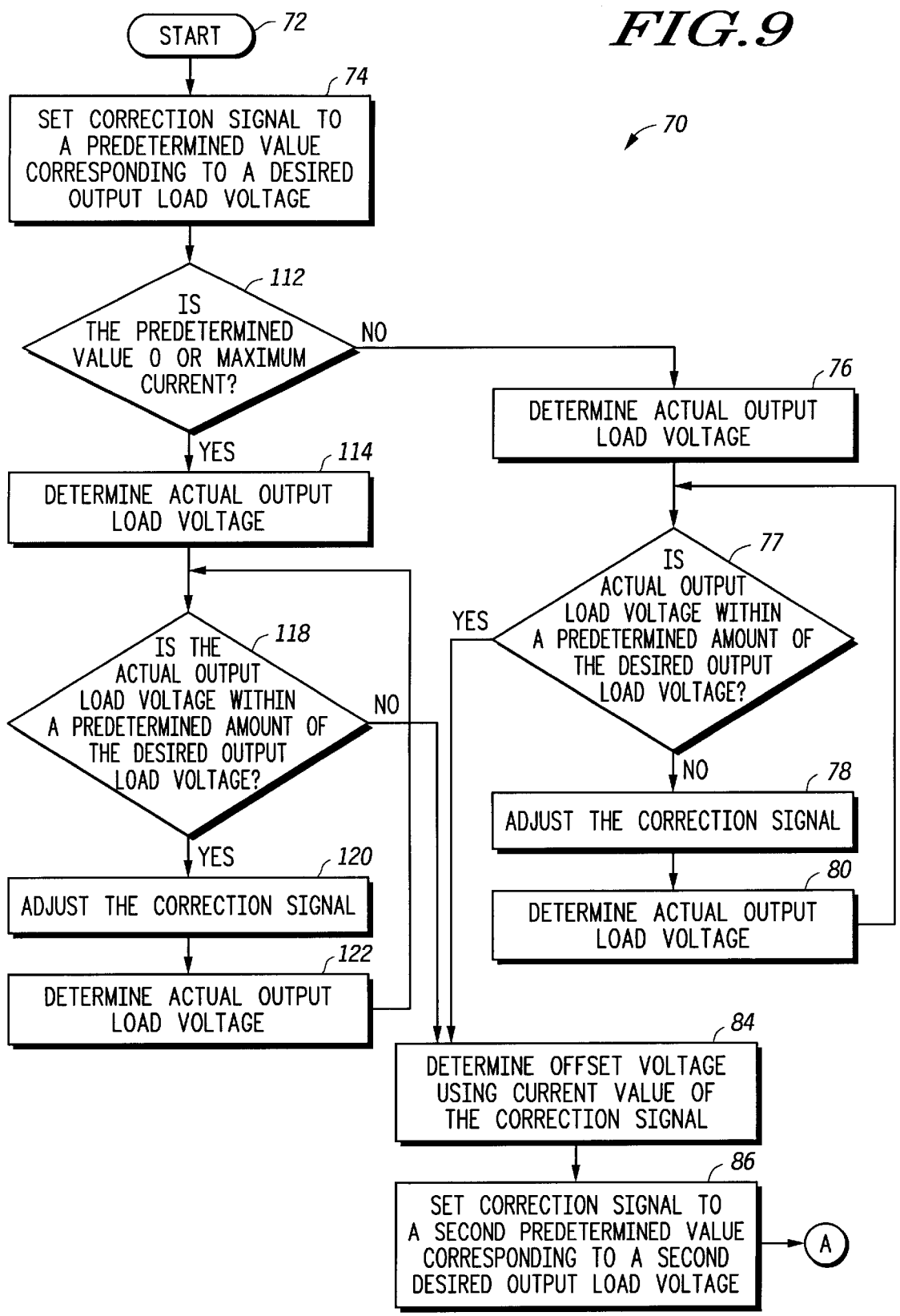
FIGS. 9 and 10 illustrate in flow chart form the operation of the loop controller of FIG. 3.
Figure 10:
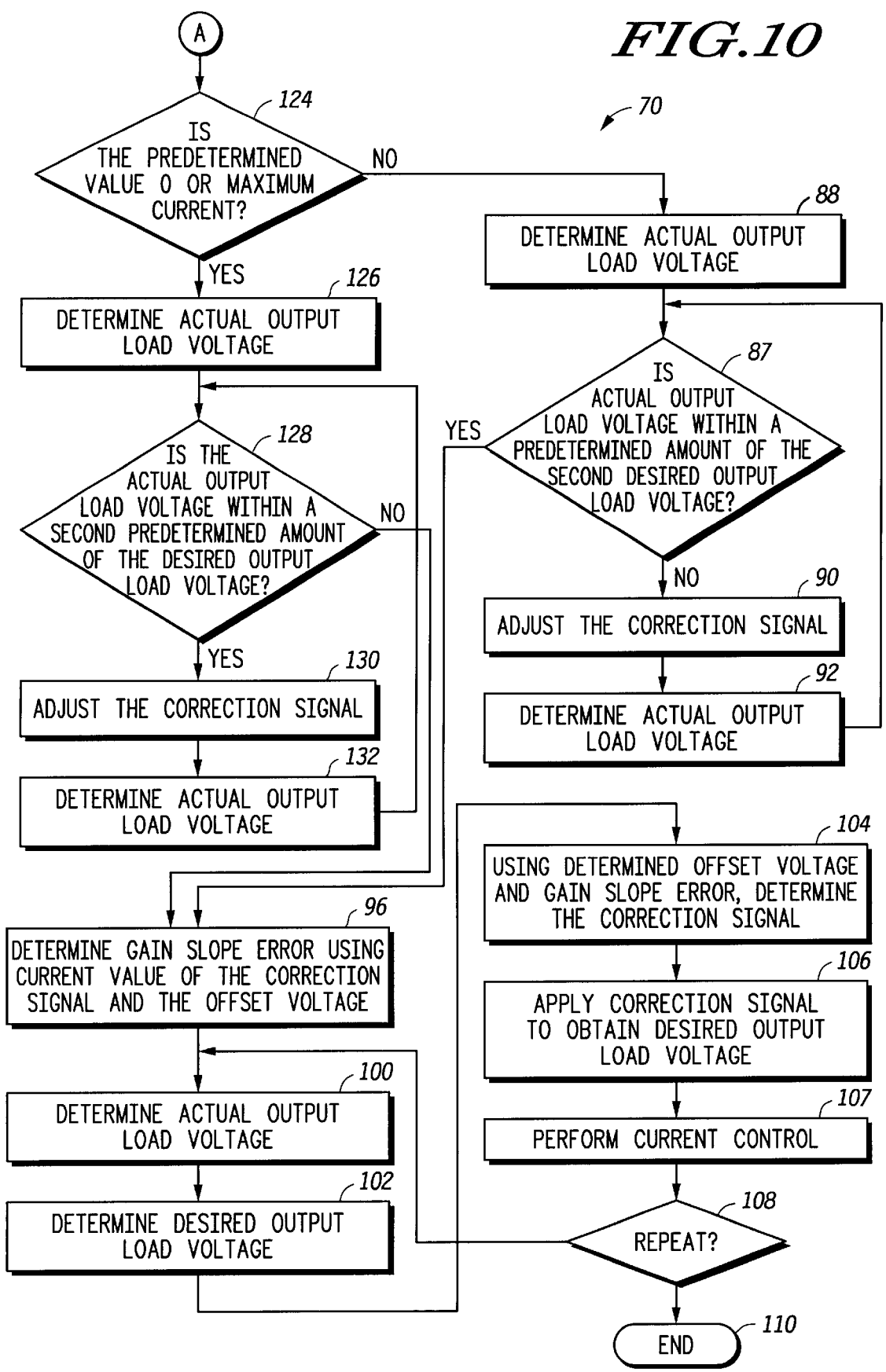

Illustrated in FIGS. 9 and 10 is a control method 70 implemented by loop controller 38 to provide the desired current/voltage curve 68 of FIG. 6 in spite of the presence of offset voltage error and gain error associated with current controller 44. The control method uses both dynamic and static techniques to accomplish the error compensation in power system 10. After a start step 72, a step 74 sets the correction signal 41 to a predetermined value that is calculated to create a desired output load voltage. In a step 112, a determination is made as to whether the predetermined value has a value that represents an output load voltage having either zero current flow or the maximum current $I_{max}$ flow as represented in FIG. 6. For these two areas of operation, offset voltage can result in constant current values for differing output voltage values due to offset error. An example of each area of operation is respectively illustrated in connection with curve 60, curve 61 and curve 62. If the answer to the determination in step 112 is "no", then a step 76 is executed wherein the actual output load voltage across output load 26 is determined. In a step 77, a determination is made as to whether the actual output load voltage is within a predetermined amount of the desired output load voltage. The output load voltage is determined by converting a scaled version of the actual output load voltage to a digital value with A/D converter 36 and using circuitry within loop controller 38 to measure the resulting value. If the actual output load voltage is outside (i.e. greater than or less than) the desired output load voltage by more than the predetermined amount, the correction signal 41 is adjusted in a step 78 by using A/D converter, loop controller 38 and D/A converter 40. In a step 80, the actual output load voltage is again determined in response to using the adjusted correction signal from step 78. Steps 77, 78 and 80 are repeated until the actual output load voltage is brought within the predetermined amount of the desired output load voltage and a step 84 is entered. This adjusted correction signal represents the correction required taking into account all error sources such as offset voltage and gain error.

If the answer to the determination in step 112 is "yes", then a step 114 is executed wherein the actual output load voltage across output load 26 is determined. In a step 118, a determination is made as to whether the actual output load voltage is within a predetermined amount of the desired output load voltage. If the actual output load voltage is within the desired output load voltage by the predetermined amount, the correction signal 41 is adjusted in a step 120 by using A/D converter, loop controller 38 and D/A converter 40 to determine a point at which the actual output load voltages differs from an expected value by more than the predetermined amount. The correction signal at that point has a value that compensates for the offset voltage and gain error that exist in connection with either a zero or a maximum current value. In a step 122, the actual output load voltage is determined in response to using the adjusted correction signal from step 120. Steps 118, 120 and 122 are repeated until the actual output load voltage is brought outside the predetermined amount of the desired output load voltage and step 84 is entered.

In a step 84, the offset voltage is determined using the present value of the correction signal. It should be noted that the method taught herein functions to determine both positive valued offset error and negative valued offset error as the offset voltage can vary with temperature, age of product and production variations. Since most error amplifiers have output voltage swings only in the positive voltage region, such amplifiers are capable of compensating only negative offset voltages. When an offset voltage exists, the present invention functions to provide a correction signal that will adjust the output load voltage by controlling power switch 49 to conduct at the proper time. In a step 86, the correction signal is set to a second predetermined value that corresponds to a second desired output load voltage. Two distinct desired output load voltages are used in the method taught herein for the purpose of calculating a gain error of the system as determined from the slope of the voltage/current graph of FIG. 6 that is formed from the two predetermined desired output load voltages.

Referring to FIG. 10, a continuation of the process is illustrated. In a step 124, a determination is made as to whether the second predetermined value is a correction value for the operating condition of either zero current or maximum current, $I_{max}$. If neither the zero nor maximum current condition is present in connection with the second predetermined value, the actual output load voltage is determined in connection with the second predetermined value for correction signal 41 during a step 88. In a step 87, a determination is made as to whether the actual output load voltage is within a predetermined amount of the second desired output voltage. If the output load voltage is within the predetermined amount, then the process proceeds to a step 96. However, if the output load voltage is not within the predetermined amount, the correction signal 41 is adjusted in a step 90. After the adjustment of the correction signal 41, the actual output load voltage is again determined and step 87 is again repeated. Steps 87, 90 and 92 are iterative and repeated until the load voltage is corrected to be within the predetermined amount of the second desired output load voltage. At such point, the proper adjustment of correction signal 41 has occurred for correcting for offset voltage in connection with the second desired output load voltage.

If in step 124 the determination is made that the second predetermined value represents either zero current or $I_{max}$ in the graph of FIG. 6, the actual output load voltage is determined in a step 126. With the actual output load voltage known, a determination is made in a step 128 whether the actual output load voltage is within a second predetermined amount of the desired output load voltage. Since this path of the process represents the presence of either zero current or $I_{max}$, a value for correction signal 41 must be found that places the actual output load voltage outside of the predetermined amount within the desired output load voltage. If that amount initially is present, step 128 is immediately followed by step 96. Otherwise, steps 130 and 132 are processed one or more times by varying the correction signal 41 until the actual output load voltage is determined to no longer have a value that is within the second predetermined amount of the desired output load voltage. At the transition point where the actual output load voltage exceeds the predetermined amount from the desired output load voltage, this value of the correction signal 41 can be used to determine the error in power system 10.

In a step 96, the gain slope is determined using the current value of the correction signal 41 and the offset voltage previously calculated in step 84. At this point, loop controller 38 has dynamically determined the correct correction signal 41 to use to compensate for both the comparator 42 offset voltage and for voltage gain error caused by component value variation due to manufacturing variations.

In general, step 96 may be implemented with two data values, such as two output voltage values or two other values associated with the system 10. In other words, the looping function implemented in each group of steps 118, 120 and 122, steps 77, 78, and 80, steps 128, 130 and 132, and steps 87, 90 and 92 is not essential to implement. For example, the output of step 126 may be used directly in step 96. If that is the case, the offset voltage previously calculated in step 84 and the actual output load voltage measured in step 126 are used to determine the gain slope in step 96.

Steps 100, 102, 104, 106 and 108 represent circuit operation when power system 10 is in a normal operation mode. In a step 100, the actual output load voltage is again determined. In a step 102 the desired output load voltage is determined. In a step 104, the full error compensating correction signal 41 is determined using the previously determined offset voltage error and the gain slope error. In a step 106, the correction signal 41 is applied to obtain the desired output load voltage that compensates for offset error, gain slope error and the actual load condition. In a step illustrated as step 107, input line current control is performed. Although the current control is illustrated as a discrete step, it should be well understood that the current control may be performed at any point in time in parallel with the voltage control of steps 100, 102, 104, 106 and 108. In a step 108, a determination is made whether repetition of power factor correction in the normal system control process is to be repeated or not. When power factor correction is complete, an end step 110 is executed.

In some applications, an initial calibration is performed and the calibration is only performed once. In other applications, the calibration can be more dynamic and the process repeated more often.

The control method 70 may be implemented with software, with hardware or with a combination of both hardware and software. By now it should be apparent that a D.C. offset error cancellation method for a digitally controlled feedback loop of a D.C. to D.C. or an A.C. to D.C. converter has been provided. The control method reduces the passive component count and eliminates manual trimming of components within such a system, thereby reducing the total system cost. The D.C. offset error of the hysteretic circuit has been estimated and the gain value can be further exploited to substantially cancel error in the feedback loop of power system 10. No adjustable components or precision components are required and neither is a production line calibration procedure. The present invention is capable of compensating for both positive and negative offset voltages of the current controller 44.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific embodiments. However, one of ordinary skill in the art appreciates that various modifications and changes can be made without departing from the scope of the present invention as set forth in the claims below. For example, various processors, such as an eight-bit microcontroller or more advanced processors such as DSPs (digital signal processors), may be implemented within loop controller 38 to measure the threshold voltage error. In many instances, the processing required to implement the present invention may be performed using spare resources of such processors that are present for other functionality. The present invention is illustrated in the context of a power system that is performing both voltage regulation and power factor correction. However, the present invention is useful in those power systems in which only voltage regulation is being performed and only half-wave voltage rectification may be implemented rather than full-wave rectification. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power system having a corresponding a gain, comprising:

a voltage converter coupled to receive an input voltage, the voltage converter having a power switch and an output node to provide a desired D.C. voltage to a load;

a current controller sense amplifier coupled to receive a correction signal at a first input thereof, a second input, and an output for providing an output signal to the power switch in response to the correction signal, the current controller sense amplifier having a corresponding offset voltage;

a line current sensor coupled to the voltage converter and the current controller sense amplifier for sensing a line current of the power system and providing the line current to the second input of the current controller sense amplifier; and a voltage controller coupled to the output node of the voltage converter and coupled to provide the correction signal, wherein the voltage controller selectively determines at least one of a closed loop gain error and the offset voltage and determines the correction signal based on the desired D.C. voltage, an actual D.C. voltage provided at the output node when the output node is coupled to the load, and the at least one of the offset voltage and the closed loop gain error.

2. The power system of claim 1, wherein the voltage converter comprises:
an A.C. voltage to D.C. voltage converter; and
a D.C. voltage to D.C. voltage converter comprising the power switch.

3. The power system of claim 1, wherein the voltage controller receives a scaled down version of the actual D.C. voltage at the output node.

4. The power system of claim 1, wherein the voltage controller measures the actual D.C. voltage.

5. The power system of claim 4, wherein the voltage controller comprises a microcontroller to determine the correction signal and calculate the at least one of the offset voltage and the closed loop gain error.

6. A method for regulating a power system, comprising:
setting a correction signal to a first predetermined value corresponding to a desired output load voltage;
determining a first actual output load voltage value;
selectively adjusting the correction signal based on the first actual output load voltage value; and
determining an offset voltage associated with a sense amplifier within a current controller in the power system using the adjusted correction signal.

7. The method of claim 6, wherein selectively adjusting comprises:
determining whether the first actual output load voltage value is within a predetermined amount of the desired output load voltage.

8. The method of claim 7, wherein selectively adjusting further comprises:
if the first actual output load voltage value is not within the predetermined amount, adjusting the correction signal and determining a second actual output load voltage value.

9. The method of claim 7, wherein selectively adjusting further comprises:
if the first actual output load voltage value is within the predetermined amount, adjusting the correction signal and determining a second actual output load voltage value.

10. The method of claim 6, further comprising:
setting the correction signal to a second predetermined value corresponding to a second desired output load voltage;
determining a second actual output load voltage value;
selectively adjusting the correction signal based on the second actual output load voltage value; and
determine a gain slope error corresponding to the power system using the adjusted correction signal and the offset voltage.

11. The method of claim 10, wherein selectively adjusting comprises:
determining whether the second actual output load voltage value is within a predetermined amount of the second desired output load voltage.

12. The method of claim 11, wherein selectively adjusting further comprises:
if the second actual output load voltage value is not within the predetermined amount, adjusting the correction signal and determining a third actual output load voltage value.

13. The method of claim 11, wherein selectively adjusting further comprises:
if the first actual output load voltage value is within the predetermined amount, adjusting the correction signal and determining a third actual output load voltage value.

14. The method of claim 10, wherein after determining the offset voltage and the gain slope error, the method further comprises:
determining a third actual output voltage value;
determining a third desired output voltage of the power system;
using the determined offset voltage and gain slope error to determine a correction value;
setting the correction signal to the correction value; and
applying the correction signal to obtain the third desired output voltage.

15. The method of claim 6, wherein after determining the offset voltage, the method further comprises:
determining a second actual output voltage value;
determining a second desired output voltage of the power system;
using the determined offset voltage to determine a correction value;
setting the correction signal to the correction value; and
applying the correction signal to obtain the second desired output voltage.

16. The method of claim 15, wherein the correction signal is applied to a current controller portion of the power system.

17. The method of claim 16, further comprising using the determined correction signal to control a power switch of the power system.

18. The method of claim 15, wherein determining offset voltage is performed by a voltage controller portion of the power system.

19. A method for regulating a power system having a current controller coupled to a voltage controller, the method comprising:
determining at least one of an offset voltage associated with a sense amplifier within the current controller and a closed loop gain error associated with the power system;
determining an actual output voltage provided by the power system and a desired output voltage of the power system; and
determining a correction signal based on the determined at least one of the offset voltage and the closed loop gain error, the actual output voltage, and the desired output voltage.

20. The method of claim 19, further comprising:
providing the correction signal to the current controller; and
adjusting a line current of the power system.

21. The method of claim 20, wherein adjusting further comprises:
controlling a power switch coupled to the current controller, the power switch regulating the actual output voltage provided to the voltage controller.

22. The method of claim 19, wherein determining the at least one of the offset voltage and the closed loop gain error comprising the voltage controller calculating the at least one of the offset voltage and the closed loop gain error.

23. A method for regulating a power system, comprising:
setting a correction signal provided by a voltage controller to a first predetermined value corresponding to a desired output load voltage;
determining a first actual output load voltage value with the voltage controller;
selectively adjusting the correction signal based on the first actual output load voltage value to provide an adjusted correction signal;

sensing with a sense amplifier a differential between the adjusted correction signal and a sensed line current of the power system to provide a control signal for controlling voltage across an output load; and determining a gain slope error using the voltage controller, the gain slope error corresponding to the power system using the adjusted correction signal.

24. The method of claim 23, wherein after determining the gain slope error, the method further comprises:

determining a second actual output voltage value;

determining a second desired output voltage of the power system;

using the determined gain slope error to determine a correction value;

setting the correction signal to the correction value; and applying the correction signal to obtain the second desired output voltage.

25. The method of claim 24, wherein applying further comprises providing the correction signal to a current controller portion of the power system.

26. The method of claim 25, wherein applying further comprises using the correction signal to control a power switch of the power system.

27. The method of claim 24, wherein the voltage controller further comprises an analog-to-digital converter, a processor coupled to the analog-to-digital converter for implementing loop control and a digital-to-analog converter coupled to the processor for providing the correction signal.

* * * * *

UNITED STATES PATENT AND TRADEMARK OFFICE
CERTIFICATE OF CORRECTION

PATENT NO. : 6,650,092 B2
DATED : November 18, 2003
INVENTOR(S) : Petr Lidak and Nigel Allison It is certified that error appears in the above-identified patent and that said Letters Patent is hereby corrected as shown below:

Column 8,
Line 43, change "corresponding a gain," to -- corresponding closed loop gain, --.

Signed and Sealed this

Thirty-first Day of January, 2006

JON W. DUDAS
*Director of the United States Patent and Trademark Office*